United States Patent [19]
Van Haaren et al.

[11] Patent Number: 5,737,044
[45] Date of Patent: Apr. 7, 1998

[54] ILLUMINATION SYSTEM USING A BROADBAND CHOLESTERIC POLARIZER HAVING ITS SURFACE OF MAXIMUM HELIX PITCH FACE THE RADIATION SOURCE

[75] Inventors: Johannes A. M. M. Van Haaren; Dirk J. Broer, both of Eindhoven, Netherlands

[73] Assignee: U.S. Philips Corporation, New York, N.Y.

[21] Appl. No.: 501,330

[22] Filed: Jul. 12, 1995

[30] Foreign Application Priority Data

Jul. 12, 1994 [EP] European Pat. Off. ............ 94202006

[51] Int. Cl.$^6$ .................................................. G02F 1/1335
[52] U.S. Cl. ........................ 349/61; 349/98; 349/117
[58] Field of Search ........................ 359/48, 37, 63, 359/65, 73; 349/61, 96, 98, 106, 117

[56] References Cited

U.S. PATENT DOCUMENTS

| | | | |
|---|---|---|---|
| 5,061,042 | 10/1991 | Nakamura et al. | 349/117 |
| 5,344,513 | 9/1994 | Takenaka | 359/73 |
| 5,486,884 | 1/1996 | De Vaan | 359/101 |
| 5,506,704 | 4/1996 | Broer et al. | 359/63 |

FOREIGN PATENT DOCUMENTS

| | | |
|---|---|---|
| 0606939A1 | 7/1994 | European Pat. Off. . |
| 0606940A2 | 7/1994 | European Pat. Off. . |

*Primary Examiner*—William L. Sikes
*Assistant Examiner*—Walter Malinowski
*Attorney, Agent, or Firm*—Walter M. Egbert

[57] ABSTRACT

An illumination system comprises a radiation source and a broadband, cholesteric polarizer. Such a polarizer includes a layer of a polymeric material having a cholesteric ordering, the material being ordered such that the axis of the molecular helix is oriented transversely to the layer. The broadband character of the polarizer is obtained by increasing the pitch of the molecular helix from a minimum value at a first surface of the cholesteric layer to a maximum value at the second surface of the layer. The polarizer must be positioned in the illumination system in such a manner that the second surface of the cholesteric layer faces the radiation source. By virtue thereof, the illumination system attains a surprisingly low viewing-angle dependence of the brightness and the colour. This property is further improved by using a quarter lambda plate having a negative an isotropy in the refractive index.

18 Claims, 5 Drawing Sheets

ILLUMINATION SYSTEM USING A BROADBAND CHOLESTERIC POLARIZER HAVING ITS SURFACE OF MAXIMUM HELIX PITCH FACE THE RADIATION SOURCE

The invention relates to an illumination system comprising a radiation source and a broadband, cholesteric polarizer. The invention further relates to a linear polarizer which can suitably be used in such an illumination system. The invention also relates to a display device comprising such an illumination system.

An illumination system as well as a display device of the type mentioned in the opening paragraph are described in the non-prepublished European Patent Application with application number 94200023.3 (EP-A 606.939). Further, the non-prepublished European Patent Application with application number 94200026.6 (EP-A 606.940) describes a broadband linear polarizer, methods of manufacturing said polarizer and an illumination system in which said polarizer is used.

The optical components described in said Patent Applications all comprise a broadband, cholesteric polarizer. This type of polarizer comprises a layer of a polymeric material having a cholesteric ordering, the so-called cholesteric layer. By means of this layer, the state of polarization of light passing through the polarizer is influenced. The polymeric material of the cholesteric layer is ordered such that a molecular helix can be distinguished, the axis of the helix being oriented transversely to the layer. The polarizer described is of the broadband-type because the pitch of the molecular helix increases from a minimum value at a first surface of the cholesteric layer to a maximum value at the second surface of the layer.

The described illumination system has an important disadvantage. Said disadvantage relates to the viewing-angle dependence of the system. Under certain circumstances, a change of the viewing angle may lead to a fairly great variation in brightness and colour of the light transmitted. This disadvantage is particularly objectionable when such an illumination system is used in a display device.

It is an object of the invention to obviate the above-mentioned disadvantage. The invention more particularly aims at providing an illumination system and a display device having a small viewing-angle dependence of the brightness and the colour. The invention further aims at providing a linear polarizer by means of which these objects can be achieved in a display device and in an illumination system.

These and other objects are achieved by means of an illumination system comprising a radiation source and a broadband, cholesteric polarizer with a layer of a polymeric material having a cholesteric ordering, said material being ordered such that the axis of the molecular helix is oriented transversely to the cholesteric layer, and the pitch of the molecular helix increasing from a minimum value at a first surface of the cholesteric layer to a maximum value at the second surface of the layer, and the polarizer being positioned relative to the illumination system in such a manner that the layer faces the radiation source with the second surface.

In the illumination system in accordance with the invention, the broadband, cholesteric polarizer is positioned relative to the radiation source in such a manner that the surface of the polarizer having the greatest pitch length is directed towards the lamp. Experiments have shown that in this configuration, the emanating light is subject to much less coloration than the configuration in which the radiation source is situated on the other side of the polarizer. Experiments have also shown that in the configuration in accordance with the invention, the viewing-angle dependence is much smaller than in the other configuration.

An advantageous embodiment of the illumination system in accordance with the invention is characterized in that the illumination system also comprises a quarter lambda plate which is situated on the side of the polarizer facing away from the light source. By virtue of this quarter lambda plate, the light emanating from the illumination system is linearly polarized. In the absence of such a quarter lambda plate, circularly polarized light is obtained. In particular illumination systems producing linearly polarized light can suitably be used in display devices. It is noted that a quarter lambda plate is to be understood to mean herein a birefringent layer whose optical retardation has a value in the range from 125 to 150 nm at a wavelength of approximately 550 nm.

A further advantageous embodiment of the illumination system in accordance with the invention is characterized in that the quarter lambda plate is situated on the first surface of the polarizer. As the quarter lambda plate and the broadband polarizer are arranged one on top of the other so as to be in direct contact with each other, the reflection losses of the illumination system in accordance with this embodiment of the invention are considerably reduced.

Another favourable embodiment of the inventive illumination system is characterized in accordance with the invention in that the quarter lambda plate is composed of a material having a negative anisotropy in the refractive index. Surprisingly, it has been found that the use of such quarter lambda plates results in a distinct, further reduction of the viewing-angle dependence. In addition, coloration of the emanating beam decreases substantially under these circumstances.

With respect to the expression "a negative anisotropy in the refractive index" the following observation is made. A birefringent layer is characterized in that the refractive index of the layer depends on the direction of the polarized light travelling through the layer. In such a layer, two directions of polarization having maximum refractive index differences can be defined in the plane of the layer. The direction having the highest refractive index $(n_x)$ is by definition referred to as x and the direction having the smallest refractive index $(n_y)$ is referred to as y. Other directions in the x,y-plane have refractive index values in the range between $n_x$ and $n_y$. The refractive index in the direction perpendicular to the layer is referred to as $n_z$.

Materials are referred to as uniaxial materials if the value of $n_z$ is equal to that of $n_x$ or $n_y$. Birefringent layers of uniaxial material having a negative anisotropy in the refractive index are to be understood to mean herein layers in which $n_z=n_x>n_y$. These layers have a positive anisotropy if $n_z=n_y<n_x$.

There are also birefringent layers in which the $n_z$ of the material is not equal to $n_x$ or $n_y$. Said layers are referred to as biaxial layers. In this case, the anisotropy of the material is negative if $(n_x-n_z)/(n_x-n_y)<0.5$. In all other cases, the anisotropy of the material is positive. It is noted that in the illumination system, quarter lambda plates can be used which are made of either uniaxial or biaxial materials having a negative anisotropy in the refractive index.

A further interesting embodiment of the inventive illumination system is characterized in that the quarter lambda plate is made of a thin sheet hereinafter termed "foil" of oriented polymeric material. In principle, it is possible to use quarter lambda plates of inorganic materials, such as calcite.

This material has a negative anisotropy in the refractive index. The difference between the ordinary and the extraordinary refractive index of this material, however, is relatively large. Due to this, the quarter lambda plate must be approximately 0.8 micrometers thick to be suitable for use in an illumination system which is employed in the visible part of the spectrum. In practice, such a small thickness can hardly, or perhaps not at all, be realised. In addition, quarter lambda plates based on oriented foils are much cheaper than those manufactured from inorganic materials. Such oriented foils can be formed by polymerizing specific monomeric mixtures in an external field, such as a magnetic field. The manufacture of such foils can, however, also take place by stretching the foils already formed in a specific direction. Particularly good results are obtained by using a stretched foil of substituted or unsubstituted polystyrene or a copolymer thereof.

In another favourable embodiment, the inventive illumination system also comprises a dichroic polarizer which is situated on the side of the quarter lambda plate facing away from the broadband, cholesteric polarizer. By virtue of such a polarizer, the contrast of the relevant illumination system is increased. Preferably, this dichroic polarizer is situated on the quarter lambda plate. This configuration results in lower reflection losses of the light passing through.

The invention also relates to a linear polarizer for use in an illumination system. This linear polarizer is characterized in accordance with the invention in that it comprises a broadband, cholesteric polarizer as well as a quarter lambda plate, said polarizer comprising a layer of a polymeric material having a cholesteric ordering, said material being ordered such that the axis of the molecular helix is oriented transversely to the layer, and the pitch of the molecular helix increasing from a minimum value at a first surface of the cholesteric layer to a maximum value at the second surface of the layer, and the quarter lambda plate being situated on the first surface of the polarizer.

In the inventive linear polarizer, the broadband, cholesteric polarizer is positioned relative to the quarter lambda plate in such a manner that the surface of the polarizer having the smallest pitch physically contacts the quarter lambda plate. The use of a linear polarizer of this configuration in an illumination system provides for a substantial reduction of the coloration of the emanating light as compared to the configuration in which the cholesteric polarizer engages the quarter lambda plate with its opposite surface. In addition, it has been experimentally established that in the inventive configuration of the linear polarizer, the viewing-angle dependence of the illumination system is much smaller than in the other configuration.

An interesting embodiment of the linear polarizer in accordance with the invention is characterized in that the quarter lambda plate is made of a material having a negative anisotropy in the refractive index. Surprisingly, it has been found that the use of such quarter lambda plates in a linear polarizer results in a distinct, further reduction of the viewing-angle dependence of the brightness and the colour when such a polarizer is used in an illumination system.

A further favourable embodiment of the inventive linear polarizer is characterized in that the quarter lambda plate is made of a foil of an oriented polymeric material. The use of such synthetic resin foils has production-technical advantages as this type of foils can be worked relatively easily. In addition, such foils are relatively cheap. A linear polarizer which functions very satisfactorily is obtained if stretched foils of substituted or unsubstituted polystyrene or copolymers thereof are used.

Yet another advantageous embodiment of the linear polarizer in accordance with the invention is characterized in that a dichroic polarizer is situated on the surface of the quarter lambda plate facing away from the broadband, cholesteric polarizer. The use of a linear polarizer in accordance with this embodiment in an illumination system leads to a higher contrast.

The linear polarizer in accordance with the invention preferably also comprises a so-called compensation film. Such a film leads to a further reduction of the viewing-angle dependence as regards contrast and colour variation. By virtue thereof, an increase of the viewing angle of the device in which the linear polarizer is used is obtained. If the linear polarizer does not comprise a dichroic polarizer, the film is provided on the surface of the quarter lambda plate facing away from the cholesteric polarizer. If the linear polarizer comprises a dichroic polarizer, the film is provided on the surface of the dichroic polarizer facing away from the linear polarizer. The film is preferably made from an ordered synthetic resin material.

The invention also relates to a display device. This display device comprises an illumination system as described hereinabove, as well as a display panel. Said display panel comprises two transparent substrates between which a liquid crystalline material is sandwiched, an electrode pattern and a drive for these electrodes. Images are formed by locally applying electric fields to the liquid crystalline material. The display device in accordance with the invention can be of the ferro-electric, non-twisted nematic, twisted nematic, or supertwisted nematic type.

The invention will be explained in greater detail by means of exemplary embodiments and a drawing, in which FIG. 1 shows schematically and in section an embodiment of an illumination system in accordance with the invention.

FIG. 2a and 2b show spectra in which the transmission is represented as a function of the wavelength of two illumination systems.

FIGS. 3a, 3b, 3c, and 3d show graphs in which the brightness and coloration are represented as a function of the viewing angle of two illumination systems.

It is noted that for clarity the drawn parts of the Figures are not to scale.

Figure 1:
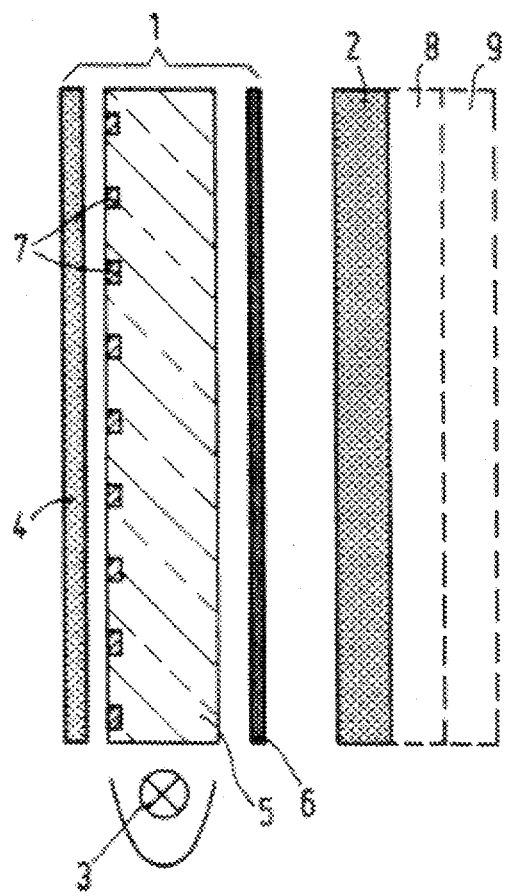

FIG. 1 shows schematically and in section an embodiment of the inventive illumination system. This system comprises a radiation source 1 and a broadband, cholesteric polarizer 2. The radiation source includes a light source 3, a reflector 4, a light conductor 5 and a diffuser 6. The unpolarized light generated via the light source 3 is coupled into the light conductor 5. This light conductor is composed of a material which is transparent to light, for example synthetic resin, such as PMMA. The surface facing the reflector 4 is provided with scattering elements 7. The light coupled in is scattered on these elements, whereafter it is guided, possibly via reflection at reflector 4, in the direction of the broadband polarizer via the diffuser. The reflector 4 may be composed of a rubber filled with a white dye, such as titanium dioxide or barium sulphate. The diffuser 6 may comprise a scattering foil. The radiation source 1 described herein ensures that the unpolarized light is incident on the cholesteric polarizer 2 in a very uniform manner. It is noted that the term "radiation source" is to be interpreted in a broad sense. It also includes, for example, a reflective layer which reflects radiation generated outside the illumination system by the broadband polarizer.

The broadband polarizer 2 comprises a layer of a polymeric material having a cholesteric ordering, said material being ordered such that the axis of the molecular helix is oriented transversely to the cholesteric layer. The pitch of the molecular helix increases from a minimum value at a first surface of the cholesteric layer to a maximum value at the second surface of the layer. The polarizer is positioned in the illumination system in such a manner that the cholesteric layer faces the radiation source with its second surface.

In the non-prepublished European Patent Application having application number 94200026.6(EP-A 606.940), a number of methods of manufacturing a broadband cholesteric polarizer are described. In the present case, the starting material used is a mixture of nematogenic and chiral monomers on the basis of diacrylates having different reactivity values. A small quantity of a dye was added to this mixture. The mixture was provided between two parallel substrates and cured by means of actinic radiation. During curing of the mixture, a radiation profile was provided across the layer to be polymerized. In this manner, a continuous variation of the pitch length of the molecular helix of the cholesteric material was obtained. The pitch length of the helix at the second surface was 0.58 micrometer, while the pitch length at the first surface was 0.20 micrometer.

The viewing-angle dependence of an illumination system constructed as described hereinabove was examined. It was found that said dependence was much smaller than that of a system in which the surface of the broadband cholesteric polarizer having the smallest pitch length faces the radiation source.

The inventive illumination system further preferably comprises a quarter lambda plate and a dichroic polarizer. The presence of these elements, however, is not essential to the invention. The quarter lambda plate 8 and the dichroic polarizer 9 are also shown in FIG. 1. They are preferably incorporated in the illumination system as a three-layer structure. However, these three optical components can alternatively be incorporated in the system as individual elements.

An illumination system of the above structure was subjected to a number of measurements. In the broadband polarizer used, the pitch length varied from 0.20 micrometer at one surface of the optically active layer to 0.58 micrometer at the other surface of this layer. The broadband polarizer was provided, in succession, with an achromatic quarter lambda plate and a dichroic polarizer having a thickness of 10 micrometers.

Figure 2A:
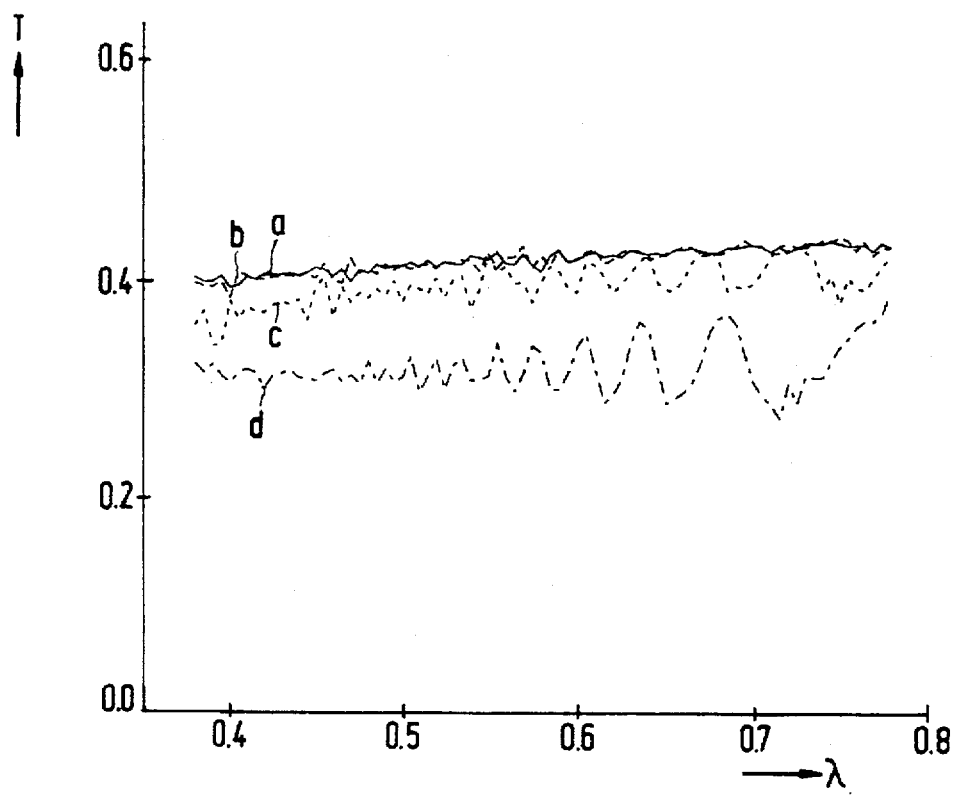
Figure 2B:
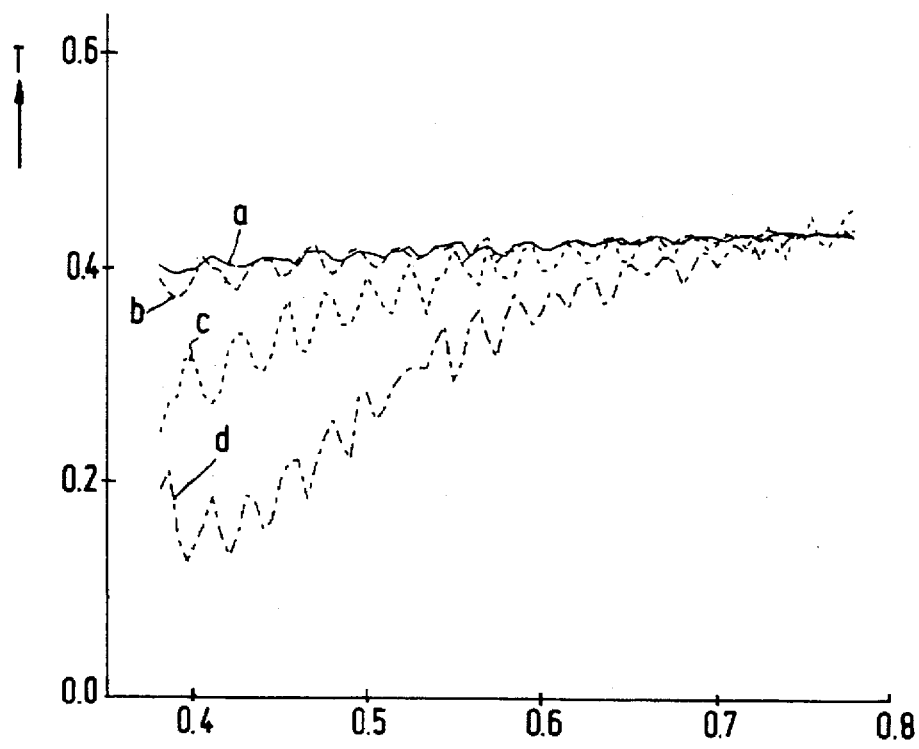
Figure 3A:
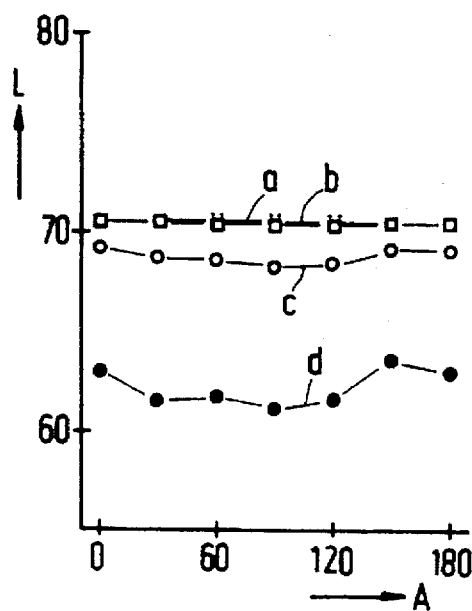
Figure 3B:
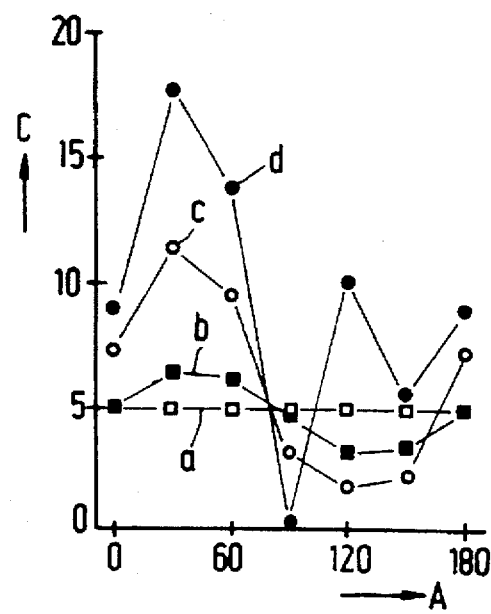
Figure 3C:
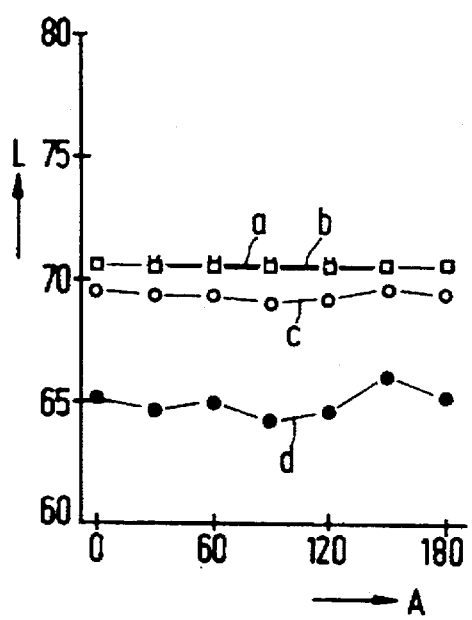
Figure 3D:
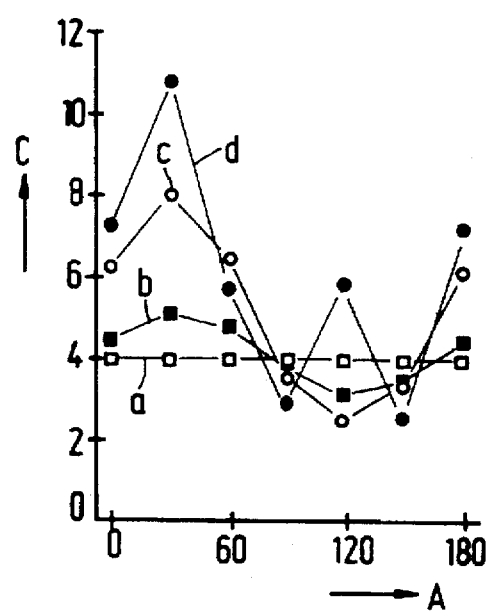

FIG. 2 shows the difference between the two possible orientations of the broadband, cholesteric polarizer in the illumination system by means of transmission characteristics. FIG. 2-a shows the situation in accordance with the invention, in which the surface of the broadband polarizer having the largest pitch length faces the radiation source. FIG. 2-b shows the other situation, which is not in accordance with the invention. In either case, the transmission T was determined as a function of the wavelength λ (micrometer) through an angle relative to the normal to the broadband polarizer of 0° (curve a), 15° (curve b), 30° (curve c) and 45° (curve d).

FIGS. 2-a and 2-b show that the illumination system in accordance with the invention has a much smaller wavelength dependence of the transmission than the system which is not in accordance with the invention. In practice, this difference is perceived as a strong coloration of the system which is not in accordance with the invention. In the system in accordance with the invention, coloration occurs to a much smaller degree.

The practical difference between a quarter lambda plate having a positive anisotropy in the refractive index and a quarter lambda plate having a negative anisotropy in the refractive index was also examined. For this purpose, use was made of an illumination system of the above-mentioned structure. The surface of the broadband polarizer having the largest pitch length (0.58 micrometer) was arranged so as to face the radiation source. The surface having the smallest pitch length (0.20 micrometer) was provided with a quarter lambda plate. A dichroic polarizer was arranged on the quarter lambda plate. In one case, the quarter lambda plate was composed of a birefringent material having a positive anisotropy (stretched polycarbonate), while in the other case, use was made of a birefringent material having a negative anisotropy (stretched polystyrene). Of said two illumination systems, the brightness L and coloration C during transmission were measured as a function of the direction of viewing which is defined by the polar angle and the azimuth angle A (in degrees). The polar angles are 0° (curve a), 15° (curve b), 30° (curve c) and 45° (curve d). A brightness of 100 corresponds to the overall quantity of light emitted by the lamp.

FIG. 3-a shows the measuring results for a quarter lambda plate of stretched polycarbonate, and FIG. 3-b shows the measuring results for a quarter lambda plate of stretched polystyrene. This Figure clearly shows that the illumination system in which the quarter lambda plate has a negative anisotropy in the refractive index has the best brightness and coloration as a function of the viewing angle. By virtue thereof, the viewing-angle dependence of such a system is much better than that of a system in which a quarter lambda plate having a positive anisotropy of the refractive index is used.

Figure 4A:
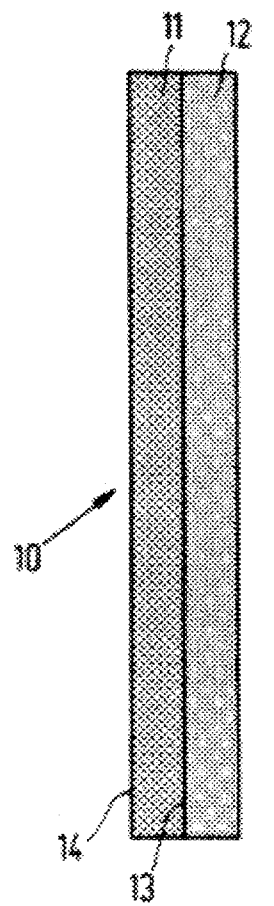
FIG. 4 is a sectional view of two embodiments of a linear polarizer in accordance with the invention.
Figure 4B:
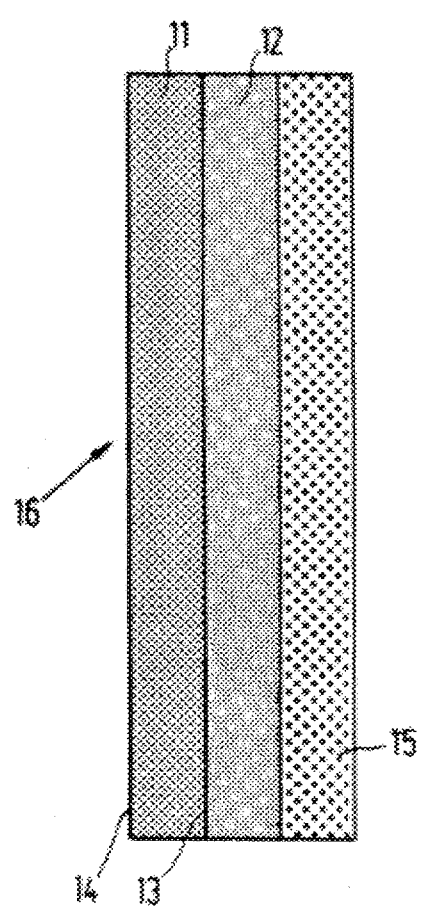

FIG. 4 shows several linear polarizers in accordance with the invention. FIG. 4-a shows a polarizer 10 comprising a broadband, cholesteric polarizer 11 and a quarter lambda plate 12. The broadband, cholesteric polarizer 11 comprises a layer of a polymeric material having a cholesteric ordering. The material is ordered such that the axis of the molecular helix is oriented transversely to the layer. In addition, the pitch of the molecular helix increases from a minimum value at a first surface 13 of the cholesteric layer to a maximum value at the second surface 14 of the layer. The quarter lambda plate 12 is situated on the first surface of the polarizer.

FIG. 4-b shows another embodiment of the linear polarizer in accordance with the invention. In addition to a broadband, cholesteric polarizer 11 and a quarter lambda plate 12, this polarizer 16 also comprises a dichroic polarizer 15. This dichroic polarizer is situated on the quarter lambda plate.

The linear polarizers shown in FIG. 4 can be manufactured by gluing together the individual foils of a broadband, cholesteric polarizer, a quarter lambda plate and, if necessary, a dichroic polarizer. If necessary, the cholesteric polarizer can be embedded between two substrates. It is alternatively possible, however, to use self-supporting cholesteric polarizers. The dichroic polarizer is composed, for example, of a layer of polyvinyl alcohol (PVA) which is situated between two substrates of cellulose acetate. The PVA layer is stretched to approximately six times the original length. Subsequently, said layer is impregnated with an iodide complex or an organic dye. The stretched PVA and the additions jointly constitute a layer which absorbs light having a polarization parallel to the direction of stretching, and which passes light having a polarization perpendicular to this direction. In the linear polarizer, the main axis of the quarter lambda plate and the light transmission direction of the dichroic polarizer should include an angle of 45°.

Figure 5:
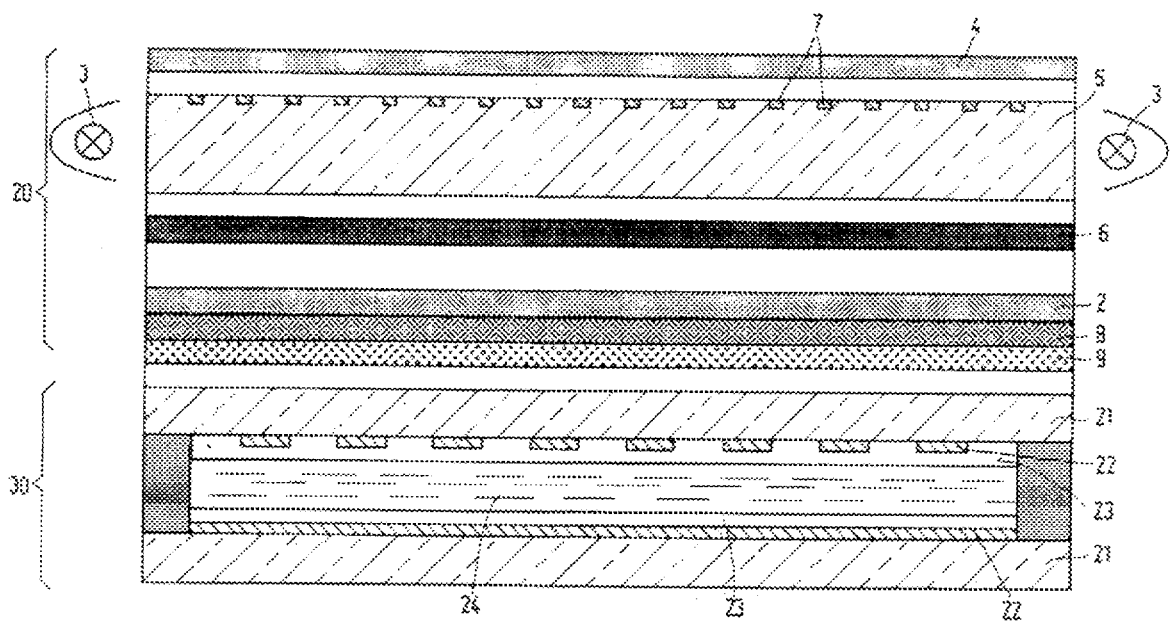
FIG. 5 shows schematically and in section a display device in accordance with the invention.

FIG. 5 shows a display device in accordance with the invention. This device comprises an illumination system 20, as described in greater detail with respect to FIG. 1. The various parts of this illumination system bear the same reference numerals as the corresponding parts of FIG. 1. The illumination system of the display device comprises two radiation sources 3, a reflector 4, a light conductor 5 and a diffuser 6. It is noted that a meander-shaped discharge lamp can be used instead of said two radiation sources and the light conductor. The system also includes a broadband, cholesteric polarizer 2, a quarter lambda plate 8 and a dichroic polarizer 9.

The display device further comprises a display panel 30. This panel is composed of two transparent substrates 21 which are each provided with an electrode array 22 and an orientation layer 23. The electrodes are made from a transparent, electroconductive material, such as indium-tin-oxide (ITO). The orientation layers may be composed of a rubbed polymer, such as polyimide or PVA, or obliquely sputtered silicon oxide. Finally, a layer 24 of ferro-electric or nematic liquid crystalline material is provided between said substrates. The ordering of this material can be influenced by electric fields which can be locally generated by means of the electrodes. The display device also comprises an electronic drive for these electrodes. For clarity, said drive is not shown in the Figure.

It is of essential importance for the effectiveness of the invention that the display device comprises a broadband, cholesteric polarizer which is properly oriented. The surface of the polarizer having the greatest pitch length of the cholesteric material must face the radiation source. Said orientation enables the display device to attain a surprisingly low viewing-angle dependence of the brightness and the colour.

We claim:

1. An illumination system comprising a radiation source and a broadband, cholesteric polarizer with a layer of a polymeric material having a cholesteric ordering, said material being ordered such that the axis of the molecular helix is oriented transversely to the layer, and the pitch of the molecular helix increasing from a minimum value at a first surface of the cholesteric layer to a maximum value at the second surface of the layer, and the polarizer being positioned in the illumination system in such a manner that the cholesteric layer faces the radiation source with the second surface.

2. An illumination system as claimed in claim 1, characterized in that said illumination system also comprises a quarter lambda plate which is situated on the side of the polarizer facing away from the light source.

3. An illumination system as claimed in claim 2, characterized in that the quarter lambda plate is made of a foil of oriented polymeric material.

4. An illumination system as claimed in claim 2, characterized in that the quarter lambda plate is composed of a material having a negative anisotropy in the refractive index.

5. An illumination system as claimed in claim 2, characterized in that the quarter lambda plate is situated on the first surface of the polarizer.

6. An illumination system as claimed in claim 5, characterized in that the quarter lambda plate is made of a foil of oriented polymeric material.

7. An illumination system as claimed in claim 5, characterized in that the quarter lambda plate is composed of a material having a negative anisotropy in the refractive index.

8. An illumination system as claimed in claim 7, characterized in that the quarter lambda plate is made of a foil of oriented polymeric material.

9. An illumination system as claimed in claim 8, characterized in that the quarter lambda plate is composed of a stretched foil of substituted or unsubstituted polystyrene or a copolymer thereof.

10. A linear polarizer which can suitably be used in an illumination system as claimed in claim 5, comprising a broadband, cholesteric polarizer as well as a quarter lambda plate, said polarizer comprising a layer of a polymeric material having a cholesteric ordering, said material being ordered such that the axis of the molecular helix is oriented transversely to the layer, and the pitch of the molecular helix increasing from a minimum value at a first surface of the cholesteric layer to a maximum value at the second surface of the layer, and the quarter lambda plate being situated on the first surface of the polarizer.

11. A linear polarizer as claimed in claim 10, characterized in that the quarter lambda plate is made of a foil of an oriented polymeric material.

12. A linear polarizer as claimed in claim 10, characterized in that the quarter lambda plate is made of a material having a negative anisotropy in the refractive index.

13. A linear polarizer as claimed in claim 12, characterized in that the quarter lambda plate is made of it foil of an oriented polymeric material.

14. A linear polarizer as claimed in claim 13, characterized in that the material of the quarter lambda plate is composed of a stretched foil of substituted or unsubstituted polystyrene or a copolymer thereof.

15. A linear polarizer as claimed in claim 14, characterized in that a dichroic polarizer is situated on the surface of the quarter lambda plate facing away from the broadband, cholesteric polarizer.

16. An illumination system as claimed in claim 1, characterized in that the illumination system also comprises a dichroic polarizer which is situated on the side of the quarter lambda plate facing away from the broadband, cholesteric polarizer.

17. An illumination system as claimed in claim 16, characterized in that the dichroic polarizer is situated on the quarter lambda plate.

18. A display device comprising an illumination system and a display panel, characterized in that a system as claimed in claim 1, is used as the illumination system.

* * * * *

UNITED STATES PATENT AND TRADEMARK OFFICE
CERTIFICATE OF CORRECTION

PATENT NO.     : 5,737,044
DATED          : April 7, 1998
INVENTOR(S)    : Johannnes A.M.M. Van Haaren It is certified that error appears in the above-identified patent and that said Letters Patent is hereby corrected as shown below:

Column 8,
Line 37, delete "it".

Signed and Sealed this

Third Day of September, 2002

Attest:

JAMES E. ROGAN
Attesting Officer        Director of the United States Patent and Trademark Office